US010261259B2

(12) United States Patent
Evans

(10) Patent No.: US 10,261,259 B2
(45) Date of Patent: Apr. 16, 2019

(54) PHOTONIC INTEGRATED CIRCUIT PACKAGE USING OPTICAL HYBRID CIRCUITS

(71) Applicant: Infinera Corporation, Sunnyvale, CA (US)

(72) Inventor: Peter W. Evans, Tracy, CA (US)

(73) Assignee: Infinera Corporation, Sunnyvale, CA (US)

( * ) Notice: Subject to any disclaimer, the term of this patent is extended or adjusted under 35 U.S.C. 154(b) by 197 days.

(21) Appl. No.: 15/398,606

(22) Filed: Jan. 4, 2017

(65) Prior Publication Data

US 2017/0192173 A1 Jul. 6, 2017

Related U.S. Application Data

(60) Provisional application No. 62/274,374, filed on Jan. 4, 2016.

(51) Int. Cl.
| | |
|---|---|
| *G02B 6/28* | (2006.01) |
| *G02B 6/26* | (2006.01) |
| *G02B 27/28* | (2006.01) |
| *G02B 6/122* | (2006.01) |
| *G02B 6/12* | (2006.01) |

(52) U.S. Cl.
CPC ............ *G02B 6/28* (2013.01); *G02B 6/1225* (2013.01); *G02B 6/266* (2013.01); *G02B 27/283* (2013.01); *G02B 2006/12111* (2013.01)

(58) Field of Classification Search
CPC .......... G02B 2006/12111; G02B 27/28; G02B 27/283; G02B 6/12; G02B 6/122; G02B 6/1225; G02B 6/26; G02B 6/266; G02B 6/28

See application file for complete search history.

(56) References Cited

U.S. PATENT DOCUMENTS

| | | | | |
|---|---|---|---|---|
| 8,548,333 B2* | 10/2013 | Nagarajan | .............. | H04B 10/40 398/138 |
| 9,281,915 B2* | 3/2016 | Kaneda | .............. | H04B 10/6166 |
| 9,806,739 B1* | 10/2017 | Kojima | .................... | H03M 7/30 |
| 2010/0322628 A1* | 12/2010 | Nagarajan | .......... | G02B 6/12004 398/65 |
| 2011/0243556 A1* | 10/2011 | Nagarajan | .............. | H04B 10/40 398/43 |
| 2013/0170833 A1* | 7/2013 | Nagarajan | .............. | H04J 14/02 398/48 |

(Continued)

*Primary Examiner* — Andrew Jordan
(74) *Attorney, Agent, or Firm* — David L. Soltz

(57) ABSTRACT

Consistent with the present disclosure, a coherent receiver PIC may be provided having waveguides that may be routed in a substantially U-shaped bend to feed both an incoming signal and a local oscillator signal into a 90-degree optical hybrid circuit, which may include a multi-mode interference (MMI) device. As a result, one or more local oscillator lasers may be provided between optical hybrid circuits in certain examples, and, in other examples, optical waveguides feeding optical signals to the optical hybrids are provided between the optical hybrid circuits. In both examples, a more compact receiver PIC layout may be achieved without waveguide crossings, that can be linearly scaled to accommodate reception of additional signals or channels without added complexity.

37 Claims, 13 Drawing Sheets

(56) References Cited

U.S. PATENT DOCUMENTS

| | | | |
|---|---|---|---|
| 2014/0199068 A1* | 7/2014 | Kaneda | H04B 10/6166 |
| | | | 398/65 |
| 2017/0163000 A1* | 6/2017 | Evans | G02B 6/12004 |
| 2017/0192173 A1* | 7/2017 | Evans | G02B 6/28 |
| 2017/0195055 A1* | 7/2017 | Evans | H01S 5/02453 |
| 2017/0195062 A1* | 7/2017 | Evans | H01S 5/02453 |
| 2018/0254832 A1* | 9/2018 | Onaka | H04B 10/532 |

\* cited by examiner

PHOTONIC INTEGRATED CIRCUIT PACKAGE USING OPTICAL HYBRID CIRCUITS

This application claims priority to U.S. Provisional Application No. 62/274,374 filed Jan. 4, 2016, the entire contents of which are incorporated by reference herein.

The present disclosure is directed toward a compact photonic integrated circuit having a simple layout and a reduced number of waveguide crossings.

BACKGROUND

Photonic integrated circuits (PICs) are known in which various optical devices are provided on a common semiconductor substrate and interconnected or optically coupled with one another by waveguides. Such devices may include lasers, and in the case of a coherent receiver that receives polarization multiplexed optical signals, photodiodes and 90 degree optical hybrids circuits. Preferably, PICs should have a high density, so that more devices can be integrated on a given die, die size is reduced, and more die can be yielded from a given wafer. However, when integrating multiple devices on a substrate, waveguides are often laid out such that they cross one another in order to route optical signals from one device to another in a spatially efficient manner. Such waveguide crossings, however, may introduce unacceptably high optical loss and cross talk, which can impair optical signal quality and introduce transmission errors.

Accordingly, there is a need for a PIC, such as a coherent receiver PIC that receives polarization multiplexed optical signals, wherein the PIC has a simple, compact design. This design preferably has few or no waveguide crossings, can scale linearly, and can simply incorporate additional receiver circuitry, without additional complexity.

SUMMARY

Consistent with the present disclosure, a receiver circuit is provided that includes a plurality of local oscillator lasers, each of which being configured to output a corresponding one of a plurality of continuous wave (CW) optical signals. Each of the plurality of CW optical signals has a corresponding one of a plurality of wavelengths. A coupler is also provided that has a plurality of inputs, a first output, and a second output. In addition, a control circuit is provided that supplies an output, such that the selected one of the plurality of CW optical signals is provided to a corresponding one of the plurality of inputs based on the output of the control circuit. Further, a first waveguide is provided that receives a first portion of the selected one of the plurality of CW optical signals from the first output of the coupler, the first waveguide having a bent portion. Moreover, a second waveguide is provided that receives a second portion of the selected one of the plurality of CW optical signals from the second output of the coupler, the second waveguide having a bent portion. Also, a first optical hybrid circuit is provided that receives a first portion of the selected one of the plurality of CW optical signals and a first modulated optical signal, the first optical hybrid circuit supplying a first plurality of mixing products, and a second optical hybrid circuit is provided that receives a second portion of the selected one of the plurality of CW optical signals and a second modulated optical signal, the second optical hybrid circuit supplying a second plurality of mixing products.

It is to be understood that both the foregoing general description and the following detailed description are exemplary and explanatory only and are not restrictive of the invention, as claimed.

The accompanying drawings, which are incorporated in and constitute a part of this specification, illustrate several embodiments and together with the description and explain the principles of the invention.

DESCRIPTION OF THE EMBODIMENTS

Consistent with the present disclosure, a coherent receiver PIC may be provided having waveguides that may be routed in a substantially U-shaped bend to feed both an incoming signal and a local oscillator signal into a 90-degree optical hybrid circuit, which may include a multi-mode interference (MMI) device. As a result, one or more local oscillator lasers may be provided between optical hybrid circuits in certain examples, and, in other examples, optical waveguides feeding optical signals to the optical hybrids are provided between the optical hybrid circuits. In both examples, a more compact receiver PIC layout may be achieved without waveguide crossings, that can be linearly scaled to accommodate reception of additional signals or channels without added complexity.

Reference will now be made in detail to the present exemplary embodiments of the present disclosure, which are illustrated in the accompanying drawings. Wherever possible, the same reference numbers will be used throughout the drawings to refer to the same or like parts.

Figure 1:
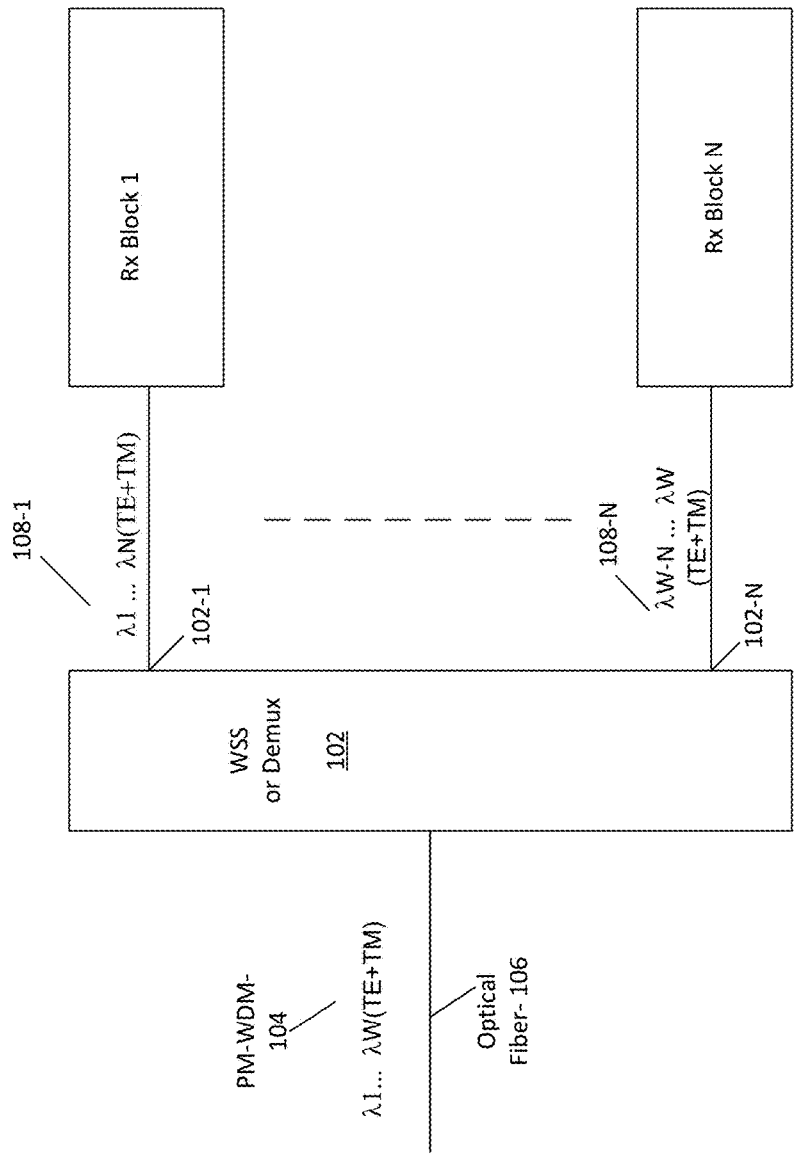
FIG. 1 illustrates a block diagram of a receiver terminal or circuit consistent with an aspect of the present disclosure.

FIG. 1 illustrates a block diagram of a receiver terminal 100 consistent with an aspect of the present disclosure. The receiver terminal 100 includes a wavelength selective switch (WSS) or optical demultiplexer 102 that receives a polarization multiplexed wavelength division multiplexed (PM-WDM) signal 104. Alternatively, a combination of wavelength splitting and power splitting and amplification may be employed instead of WSS/demultiplexer 102. PM-WDM signal 104 includes a plurality of modulated optical signals, each having a corresponding one of a plurality of wavelengths $\lambda 1 \ldots \lambda W$ and each optical signal having a first component having a first polarization, such as a transverse electric (TE) polarization and a second component having a second polarization, such as a transverse magnetic (TM) polarization. Each of the two polarization components of each optical signal in PM-WDM signal 104 is typically orthogonal to one another and may be separated from one another in a corresponding one of receiver blocks RxBlock 1 to RxBlock N, as discussed in greater detail below with reference to FIG. 2. In addition, as further described below, the second (TM) component may be rotated to have a TE polarization, and such TE polarization is maintained on a PIC in the receiver block.

As further shown in FIG. 1, PM-WDM optical signal 104 including optical signals having wavelengths λ1 . . . λW is fed to the WSS (or optical demultiplexer, "demux") 102 via an optical communication path, such as an optical fiber 106. The WSS (or demux) 102 separates the incoming PM-WDM signal 104 into a plurality of signal groupings, each of which including a subset of the optical signals included in the PM-WDM signal. For example, optical signals having wavelengths λ1 . . . λN may be output from a first port 102-1 of the WSS (or demux) 102 as grouping 108-1 and optical signals having wavelengths λW–N . . . λW may be output from the n-th port 102-N of WSS (or demultiplexer) 102. Each optical signal in each grouping 108-1 to 108-n continues to be polarization multiplexed and each such signal includes both first (TE) and second (TM) components. In addition, each optical signal grouping 108-1 to 108-n may be supplied to a respective receiver block, such as one of Rx Block 1 to Rx Block N.

Figure 2A:
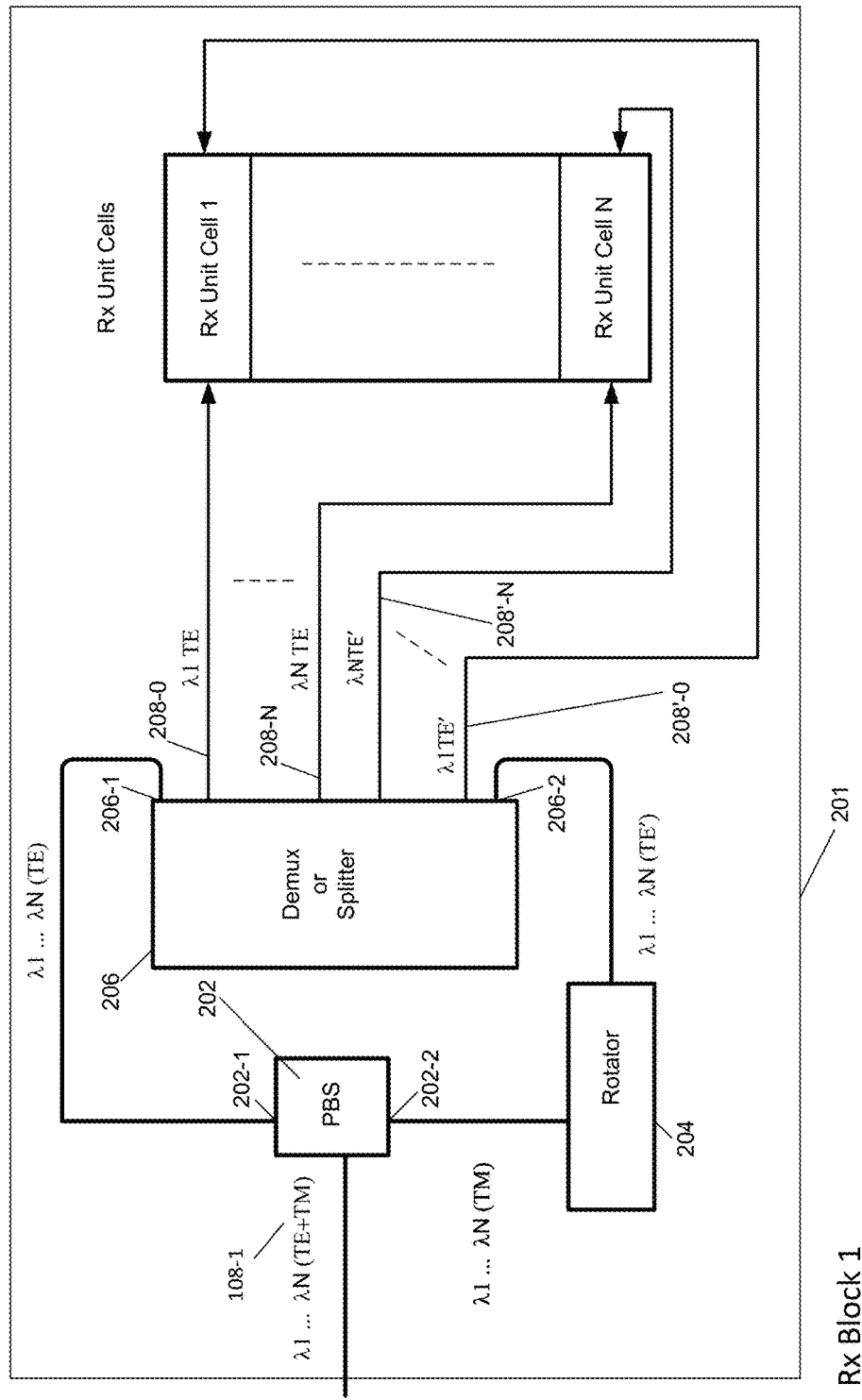
FIG. 2a illustrates a block diagram of a receiver block consistent with an additional aspect of the present disclosure.

FIG. 2a shows one such receiver block, Rx Block 1, in greater detail. Preferably, each of the remaining receiver blocks Rx Block 2 to Rx Block N has the same or similar construction as that of Rx Block 1. Rx Block 1 may be provided on a substrate 201 including compound semiconductor group III-V material, such as indium phosphide (InP), or other substrates such as silicon. Rx Block 1 may include a polarization beam splitter (PBS) 202 that may be provided on or off the substrate to receive a first optical signal grouping including polarization multiplexed optical signals having wavelengths λ1 . . . λN from port 102-1 of the WSS (or demultiplexer) 102, as noted above. Those optical signal components having a TE polarization, for example, may be supplied from a first port 202-1 of PBS 202, while optical signal components having a TM polarization may be output from a second port 202-2 of PBS 202. The TM optical signal components, each of which having a corresponding one of wavelengths λ1 . . . λN, are next supplied to a rotator 204, which rotates the TM polarization of each of the second optical signal components to have a TE polarization. Such signal components will be referred to hereafter as having a TE' polarization. Optical signal components λ1 . . . λN (TE) and optical signal components λ1 . . . λN (TE') are then provided to respective input ports 206-1, 206-2 of a demultiplexer or splitter 206. In the case of a demultiplexer, individual optical signal components are output at a respective one of a plurality of output ports or outputs of the demultiplexer 206. If a splitter is employed, a power split portion of each optical signal is provided at each output port. The operation of the Rx Bocks 1-n may be the same or similar regardless of whether a power splitter or a demultiplexer is used. Operation in the case of a demultiplexer will be described below, by way of example.

In the example shown in FIG. 2a, the PBS 202 and rotator 204 are provided on substrate 201. It is understood, however, that either one or both devices may be provided off substrate 201.

As further shown in FIG. 2a, optical signal pairs output from the demultiplexer are provided to a corresponding one of the receiver unit cells (Rx Unit Cells 1 to n) for further processing. For example, λ1 TE and λ1 TE' are fed to Rx Unit Cell 1.

Figure 2B:
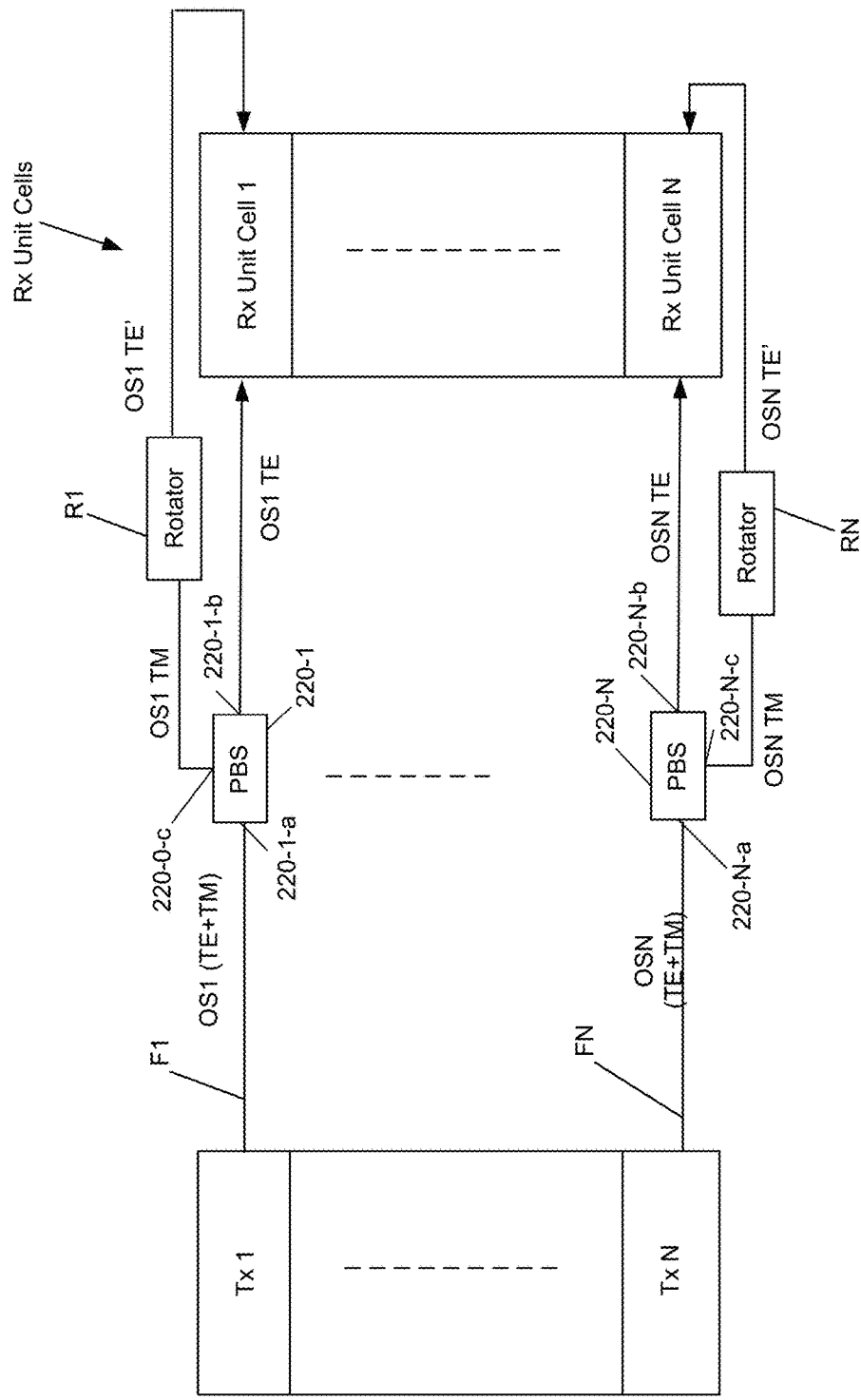
FIG. 2b illustrates an example of a system including receiver unit cells consistent with a further aspect of the present disclosure.

In the example shown in FIG. 2a, multiplexed optical signals, each of which having a different wavelength, are supplied to Rx Block. Consistent with a further aspect of the present disclosure, however, the Rx Unit Cells may be deployed in a so-called "N×N" implementation, as shown in FIG. 2b. As shown in FIG. 2b, Rx Unit Cells similar to or the same as those described herein may be coupled to an optical fiber that supplies one optical signal from a transmitter. In that case, demultiplexer or splitter 206, for example, may be omitted and multiple optical fibers F1 to FN may be provided to supply a corresponding one of optical signals OS1 to OSN from a respective one of transmitters Tx 1 to Tx N. Optical fibers F1 to FN may be deployed as a ribbon cable, for example. Each of optical signals OS1 to OSN may or may not be at a different wavelength, however, each optical signal is preferably polarization multiplexed to include both TE and TM components.

As further shown in FIG. 2b, each optical fiber F1 to FN is coupled to a corresponding one of polarization beam splitters (PBS) 220-1 to 220-N, which receives a respective one of the optical signals OS1 to OSN at a corresponding input port 220-1-a to 220-N-a. Each PBS separates the TE and TM components in each optical signal OS, and supplies the TE component (e.g., OS1 TE and OSN TE) at a respective first output port 220-1-b to 220-N-b and the TM component (e.g., OS1 TM and OSN TM) at a respective second output port 220-0-c to 220-n-c. Each TM component (OS1 TM to OSN TM) is fed to a respective one of rotators R1 to RN, which rotates the polarization of the TM component to have a TE polarization (shown as OS1 TE' to OSN TE'), in a manner similar to or the same as that described above. The TE' and TE components of each optical signal (OS1 TE to OSN TE and OS1 TE' to OSN TE') are then provided to a corresponding one of Rx Unit Cells 1 to N for further processing in a manner the same as or similar to that described herein.

Various examples of such receiver unit cells consistent with the present disclosure, which may be provided as shown in FIG. 2a, will next be described with reference to FIGS. 3a-3c, 4, and 5a-5d, and 6.

Figure 3A:
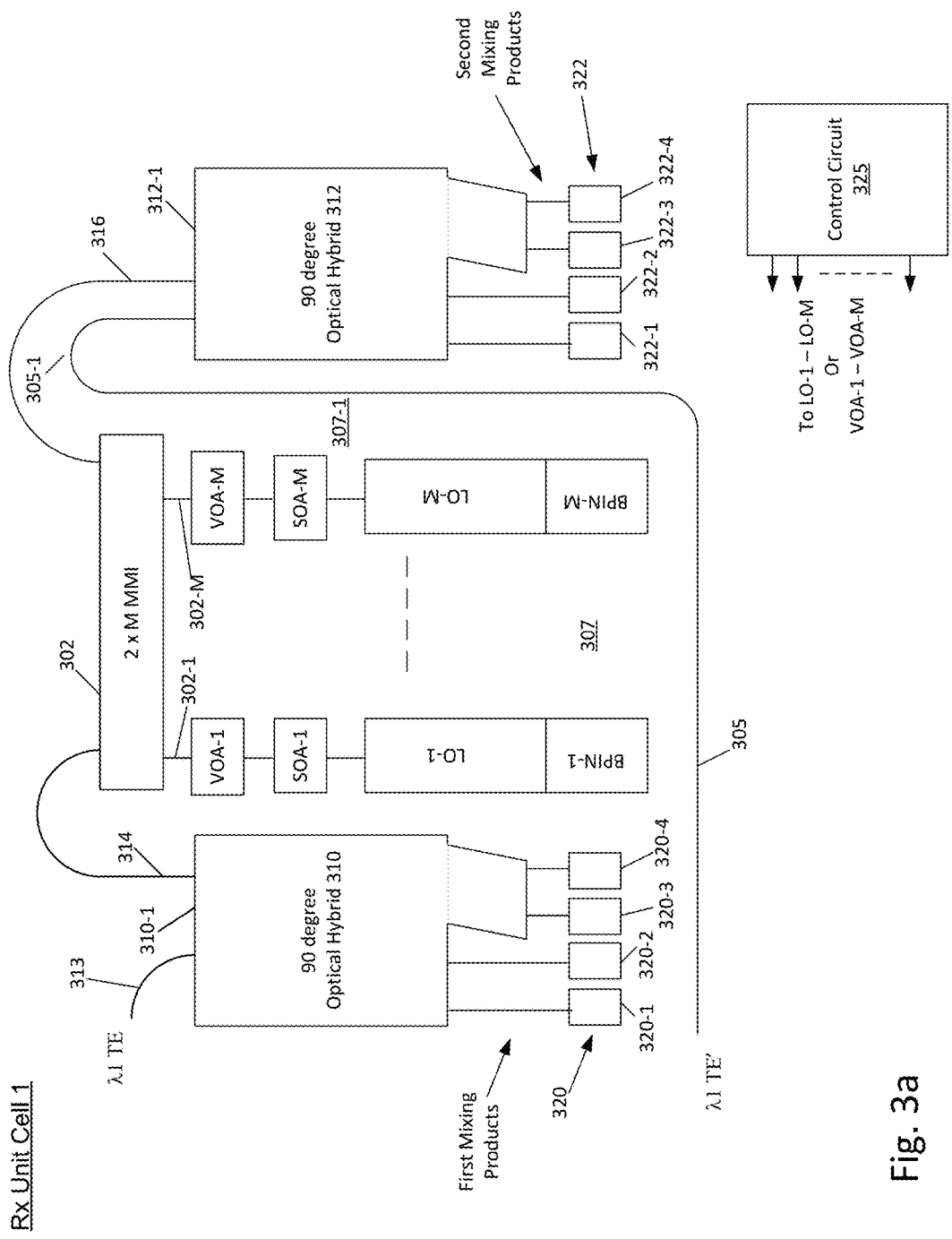
FIGS. 3a-3c, 4, 5a-5d, and 6 show examples of receiver unit cells consistent with further aspects of the present disclosure.

In FIG. 3a, RX Unit Cell 1 may include a plurality of laser local oscillators (LO-1 to LO-M), each of which optionally has an associated Back PIN photodiode (BPIN-1 to BPIN-M) that senses, for monitoring purposes, light output from a back facet or side of each of LO-1 to LO-M. In one example, at any given time, local oscillator light or a continuous wave (CW) optical signal is supplied from only one of lasers LO-1 to LO-M having a given wavelength that is close to or the same as an incoming optical signal wavelength. For other incoming optical signals supplied to other Rx Unit Cells, light from a different laser local oscillator (LO) may be selected to provide a different CW optical signal having a wavelength that is close to or the same as the other incoming optical signals. Accordingly, in the example shown in FIG. 3a, a CW optical signal is from laser LO1 is selected as having a wavelength close to or the same as incoming optical signal λ1. This arrangement allowing selection of light from multiple laser LOs is beneficial when additional LOs are provided for redundancy or when the LOs are DFBs or other lasers with limited wavelength tuning range.

As further shown in FIG. 3a, a plurality of variable optical attenuators (VOA-1 to VOA-M) as well as semiconductor optical amplifiers (SOA-1 to SOA-M) may optionally be provided to amplify and/or attenuate CW optical signals supplied by a respective one of lasers LO-1 to LO-M. For example, semiconductor optical amplifier SOA-1 may be provided to amplify a CW optical signal output from laser LO-1, assuming such light has been selected, and such CW optical signal may be attenuated to a desired power level by VOA-1. Each VOA may be implemented as a PIN photodiode.

CW optical signal selection will next be described with reference to control circuit 325. In one example, control circuit 325 may provide control signals or outputs to variable optical attenuators VOA-1 to VOA-M, and one of these controls signals may adjust the attenuation of a selected one of VOA-1 to VOA-M such that the selected VOA has an attenuation that is less than the attenuation of the remaining VOAs. As a result, the optical power of the CW optical signal ("the selected CW optical signal") output from the selected VOA may be significantly more than the remaining CW optical signals, which may be effectively blocked.

In another example, one of the control signals output from control circuit 325 may activate a corresponding one of local oscillator lasers LO-1 to LO-M, while remaining control signals may deactivate the other lasers. The activated or selected one of lasers LO-1 to LO-M, in turn, outputs the selected CW optical signal. In one example, such activation may be achieved by biasing the gain section of the selected one of local oscillator lasers LO-1 to LO-M, while the gain sections of the remaining lasers are unbiased.

As noted above, variable optical attenuators VOA-1 to VOA-M and semiconductor optical amplifiers SOA-1 to SOA-M are optional, such that either one or both VOAs and SOAs may be provided at either the input to coupler 302 (discussed below) or at the outputs of coupler 302. In addition, as noted below, variable optical attenuators and semiconductor optical amplifiers may similarly be provided at the outputs of the local oscillator lasers in each of the other embodiments disclosed herein.

In the example shown in FIG. 3a, a CW optical signal output from laser LO1 may be selected (by control signals supplied to either the VOAs, if present, or the local oscillator lasers, as noted above) and supplied to a 2×M multimode interference (MMI) coupler 302 (M being an integer), for example, that has m inputs and two outputs. Each input 302-1 to 302-M of MMI 302 is coupled or connected via a corresponding waveguide to a respective one of laser LO-1 to LO-M. Light from the selected local oscillator (LO), such as laser LO-1, is power split by the 2×m MMI to provide a first portion of the selected CW optical signal to side 310-1 of 90-degree optical hybrid circuit 310 and a second portion of the selected CW optical signal to a side 312-1 of 90-degree optical hybrid 312. Optical hybrid circuit 310 also receives the λ1 TE modulated optical signal or component via waveguide 313, and mixes λ1 TE with the first portion of the selected CW optical from LO1 received via waveguide 314. Such mixing produces, in a known manner, first mixing products to balanced photodiodes 320-1 to 320-4 in photodiode group 320. In a similar fashion, 90-degree optical hybrid circuit 312 receives, via waveguide 305, the λ1 TE' modulated optical signal or component and mixes λ1 TE' with the second portion of the CW optical signal received from waveguide 316 to supply second mixing products to balanced photodiodes 322-1 to 322-4 of photodiode group 322. Both optical hybrid circuits 310, 312 may include MMI devices as disclosed in U.S. Pat. No. 9,128,347, the entire contents of which are incorporated herein by reference. In addition, the selected mixing products of the first and second mixing products may correspond to the in-phase and quadrature components carried by each of modulated optical signals or components λ1 TE and λ1 TE' to a respective one of balanced photodiode pairs 320-1 to 320-4, 322-1 to 322-4. These balanced photodiode pairs, in turn, supply electrical signals that are fed to additional circuitry (not shown) for further processing, such as clock and data recovery.

2×M MMI coupler 302 may have additional outputs terminated with a structure or device that reduces light reflected back to the coupler. Such devices may include devices disclosed in U.S. Patent Application Publication No. 2014/0185979, the entire contents of which are incorporated herein by reference. Alternatively, light may be supplied from such additional outputs for wavelength locking (either on or off substrate 201) the LO lasers or for other monitoring purposes.

As noted above, the λ1 TE' modulated optical signal or component may be input to 90-degree optical hybrid circuit 312 via a waveguide 305 that extends over sub-region 307-1 within region 307 of substrate 201. Preferably, at least a portion of each of lasers LO1 to LO-M extends over region 307 and is between optical hybrid circuits 310 and 312. In the example shown in FIG. 3a, region 307 extends between hybrid circuit 310 and optical hybrid circuit 312, and sub-region 307-1 is between lasers LO-1 to LO-M (and laser LO-M in particular) and optical hybrid circuit 312. Waveguide 305 further has a looped or bent portion 305-1, which may be U-shaped or substantially U-shaped to feed the λ1 TE' modulated optical signal or component back to side or edge 312-1 of 90-degree optical hybrid circuit 312. With this configuration, waveguide 305, for example, does not cross or pass through other waveguides, such as waveguides 313, 314, and 316 to realize a dense layout wherein each Rx Unit Cell is compact. In an alternative embodiment, the λ1 TE' modulated optical signal or component, is fed to 90 optical hybrid circuit 310 and the λ1 TE modulated optical signal or component is output to 90 optical hybrid circuit 312 via a looping or U-shaped waveguide similar to that described above. Although a 2×M MMI coupler is disclosed above, it is understood that other couplers or power splitters may be provided instead of the 2×M MMI coupler.

Figure 3B:
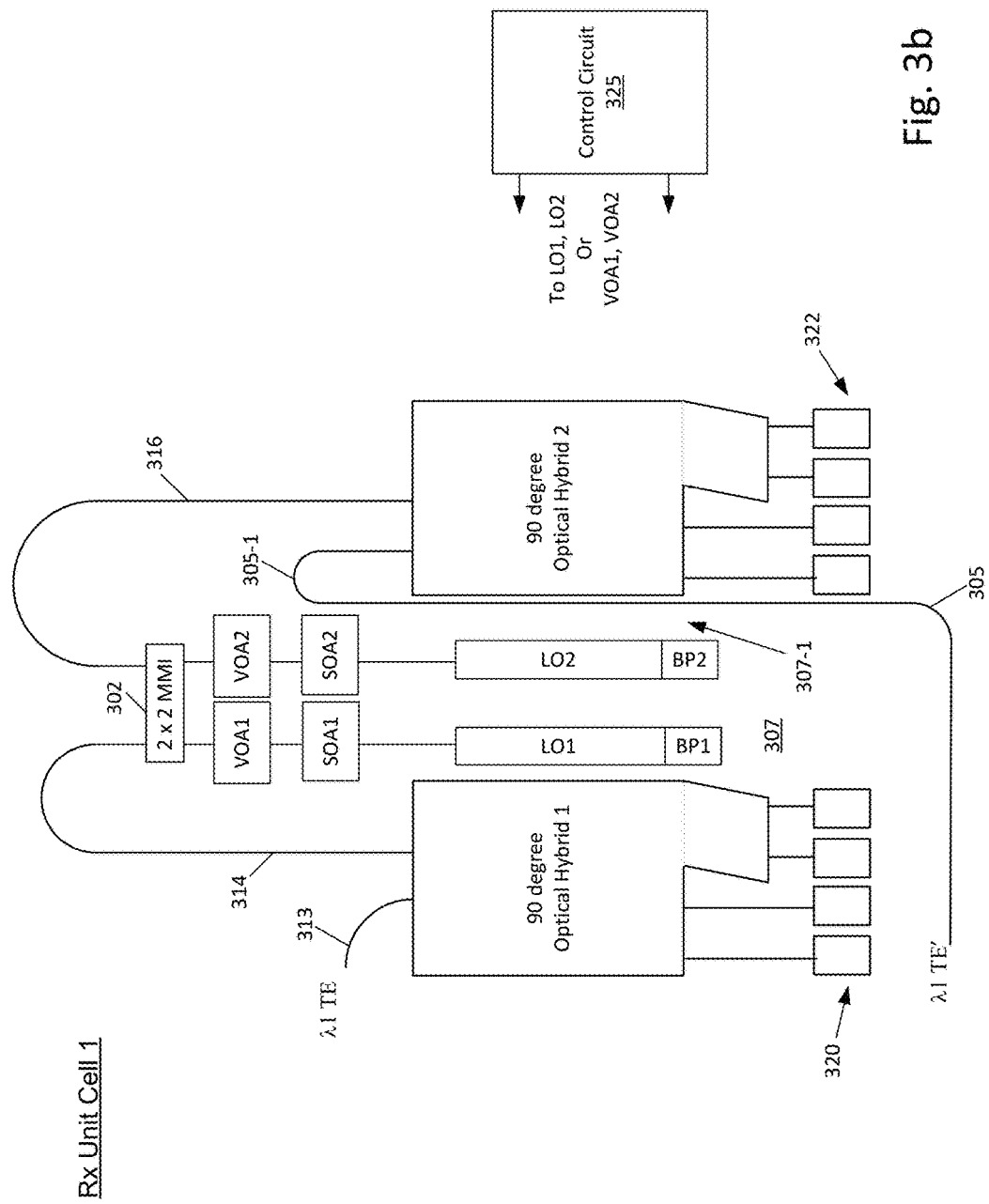

In the exemplary Rx Unit Cell shown in FIG. 3b, two LO lasers LO1 and LO2 are provided, the CW optical signal of one of which may be selected, as noted above, by control circuit 325. Here, the outputs of lasers LO1 and LO2 are fed to a 2×2 MMI coupler.

Figure 3C:
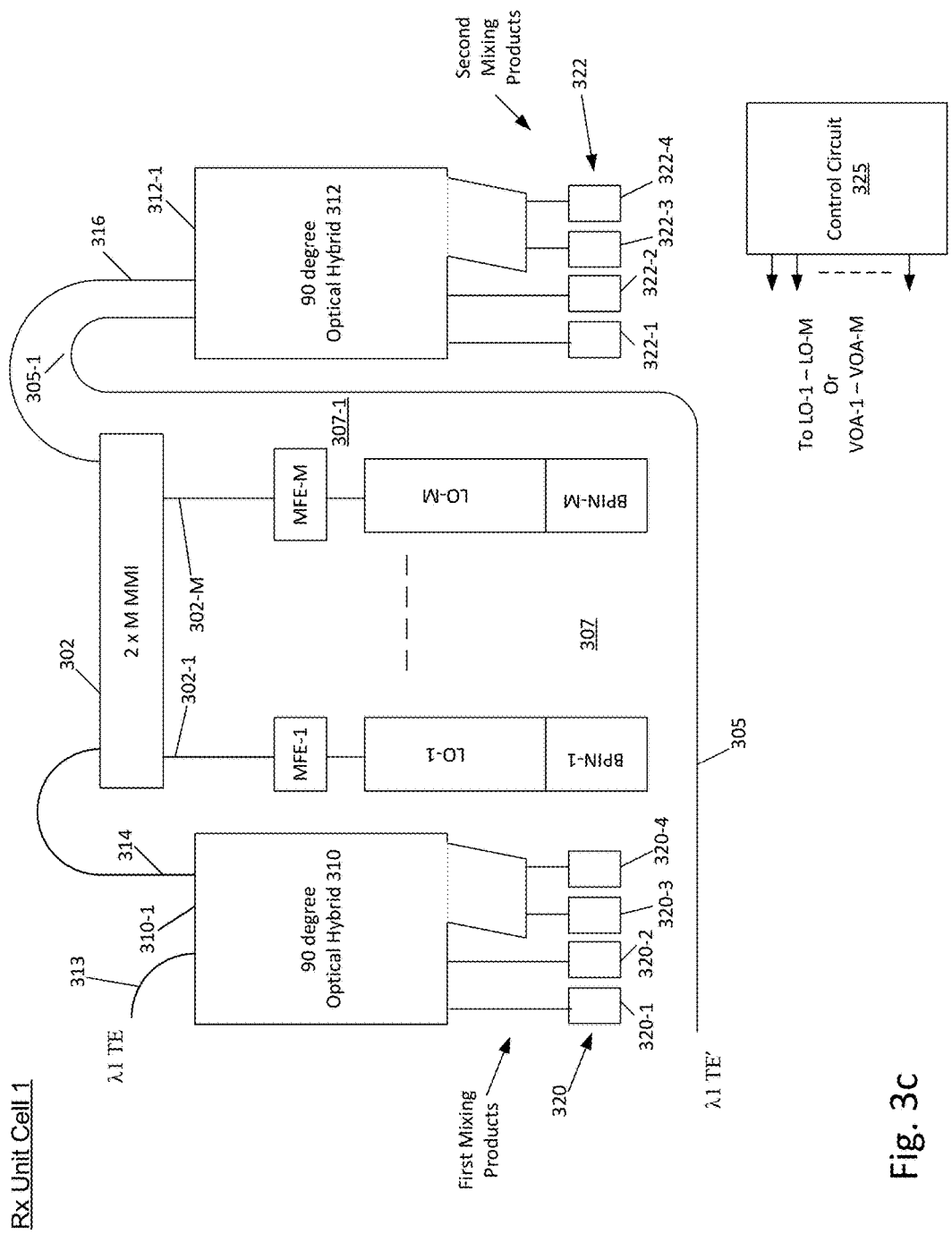

FIG. 3c shows another example, which is similar to the example shown in FIG. 3a, with the exception that each VOA, SOA pair shown in FIG. 3a is replaced by a respective one of multi-functional elements (MFE 1-M). Each of MFEs 1 to M may include either a PN junction or PIN photodiode, such that the MFE may operate as an SOA when forward biased and a VOA when reverse biased.

Figure 4:
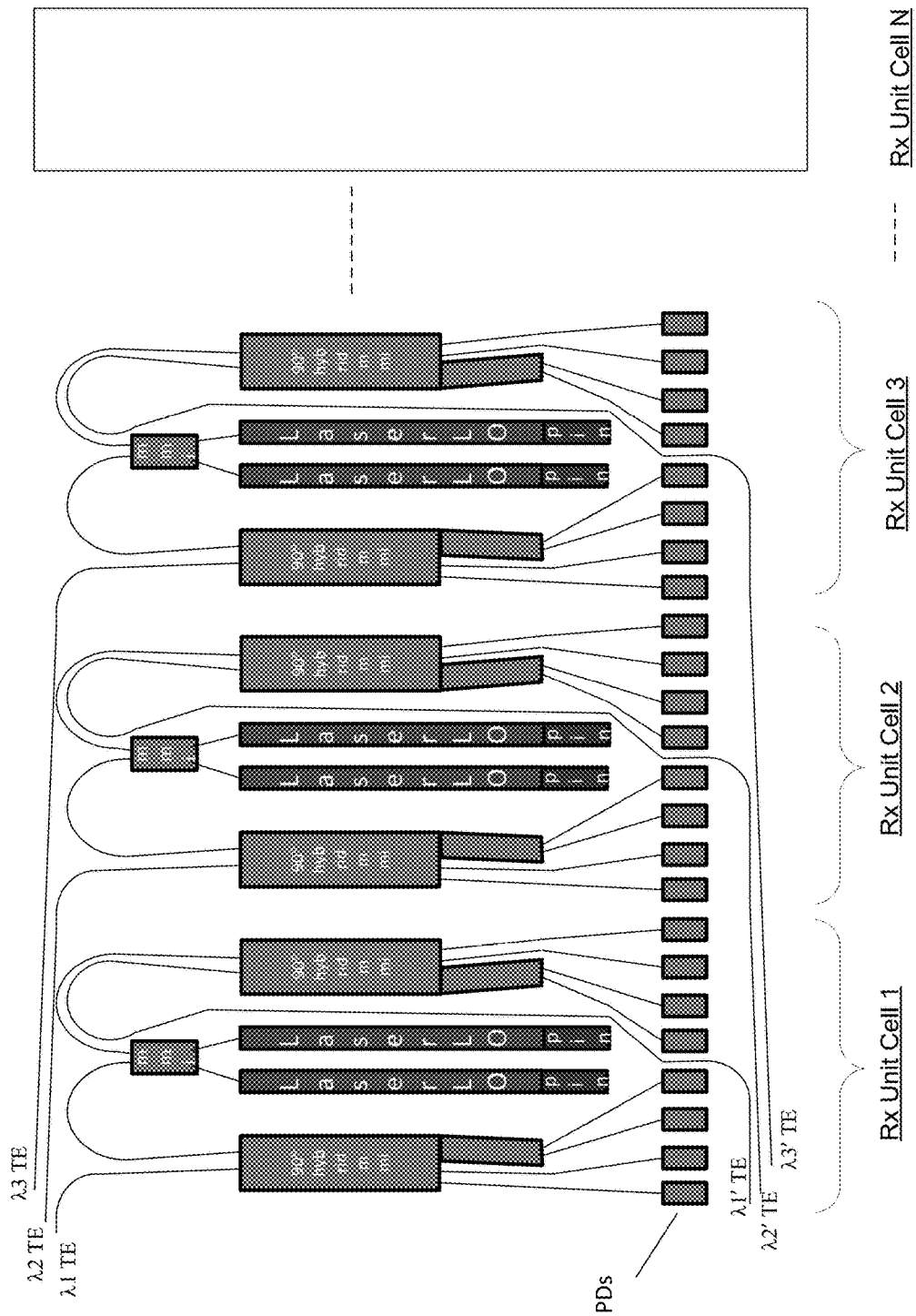

In FIG. 4, a series of Unit Cells (1 to n), each similar to that shown in FIG. 3b, is provided. Each Unit Cell shown in FIG. 4 receives a respective optical signal pairing (λ1 TE' and TE, λ1 TE' and TE, λ2 TE' and TE, ... λN TE' and TE). In a manner similar to or the same as that described above in regard to FIGS. 3a and 3b, a variable optical attenuator (VOA) or semiconductor optical amplifier (SOA) may be provided at the output of the LO laser and/or at each of the outputs of the MMI coupler in the example shown in FIG. 4.

In the examples described above, multiple LO lasers are included to provide tunability such that the same Rx Unit Cell can be used to receive optical signals over a relatively wide range of wavelengths, such as those extending over the C-band, e.g., 1528 nm to 1567 nm. If tuning over such a wide range is not necessary or desired, a one LO laser may be provided, which may be thermally or electrically tuned over a narrower range. FIGS. 5a-5d illustrate examples in which the MMI coupler and control circuit have been omitted and one LO laser is provided.

Figure 5A:
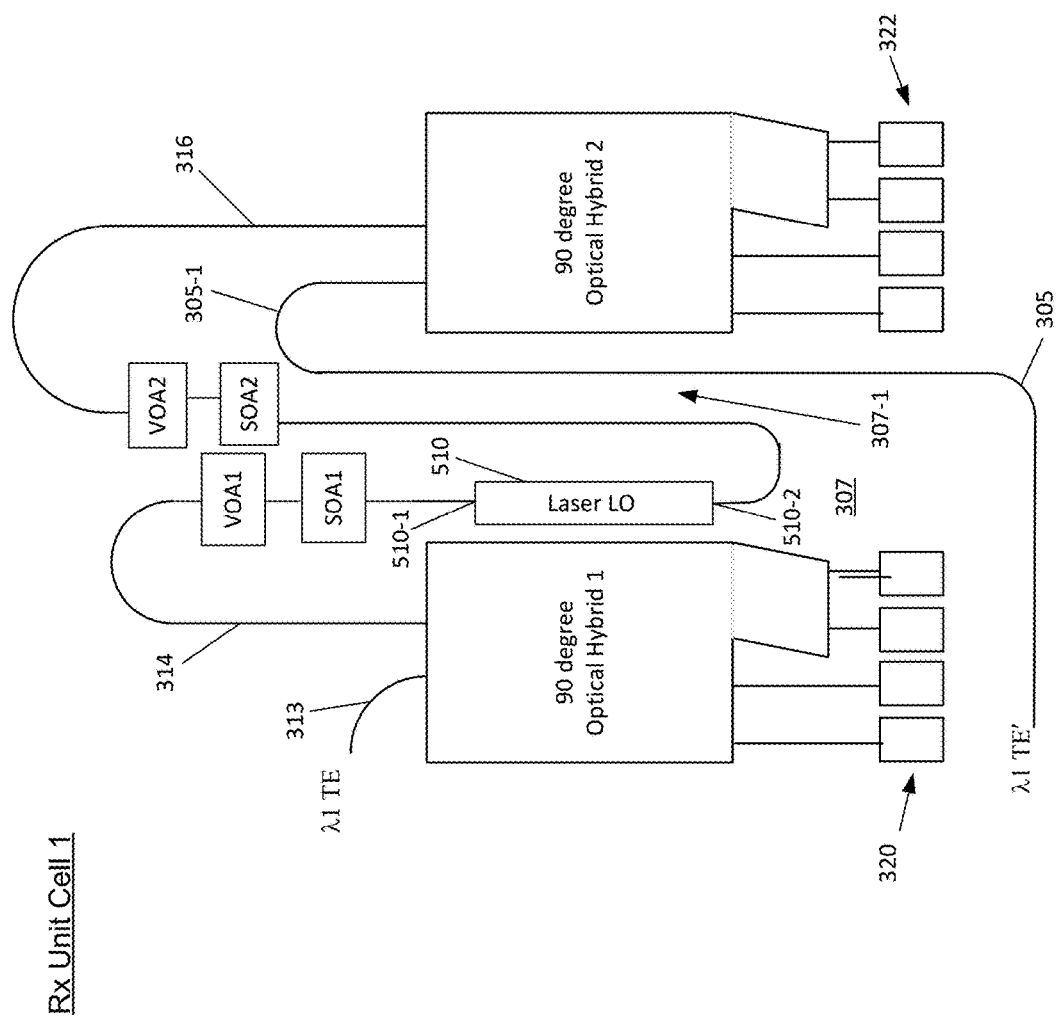

In FIG. 5a, for example, light, i.e., first CW optical signal, output from a first facet or side 510-1 of LO laser 510 is supplied to 90-degree optical hybrid 310, for example, and a second CW optical signal from the second side or facet 510-2 is supplied to 90-degree optical hybrid 312. In a manner similar to that described above, each the first and second CW optical signals may be optionally amplified by SOA1, SOA2 and/or attenuated by VOA1, VOA2, and provided respective waveguides 314 and 316. In addition, modulated optical signal or component λ0TE may be input to optical hybrid circuit 310 by waveguide 313, and modulated optical signal or component λ1TE' may be input to optical hybrid circuit 312 by waveguide 305 having looped, bent, or U-shaped portion 305-1 that avoids waveguide crossings.

In the example shown in FIG. 5a, the entire LO laser 510 is provided between 90-degree optical hybrid circuits 310 and 312. In other examples, a portion of laser 510 may extend between optical hybrid circuits 310 and 312.

Figure 5B:
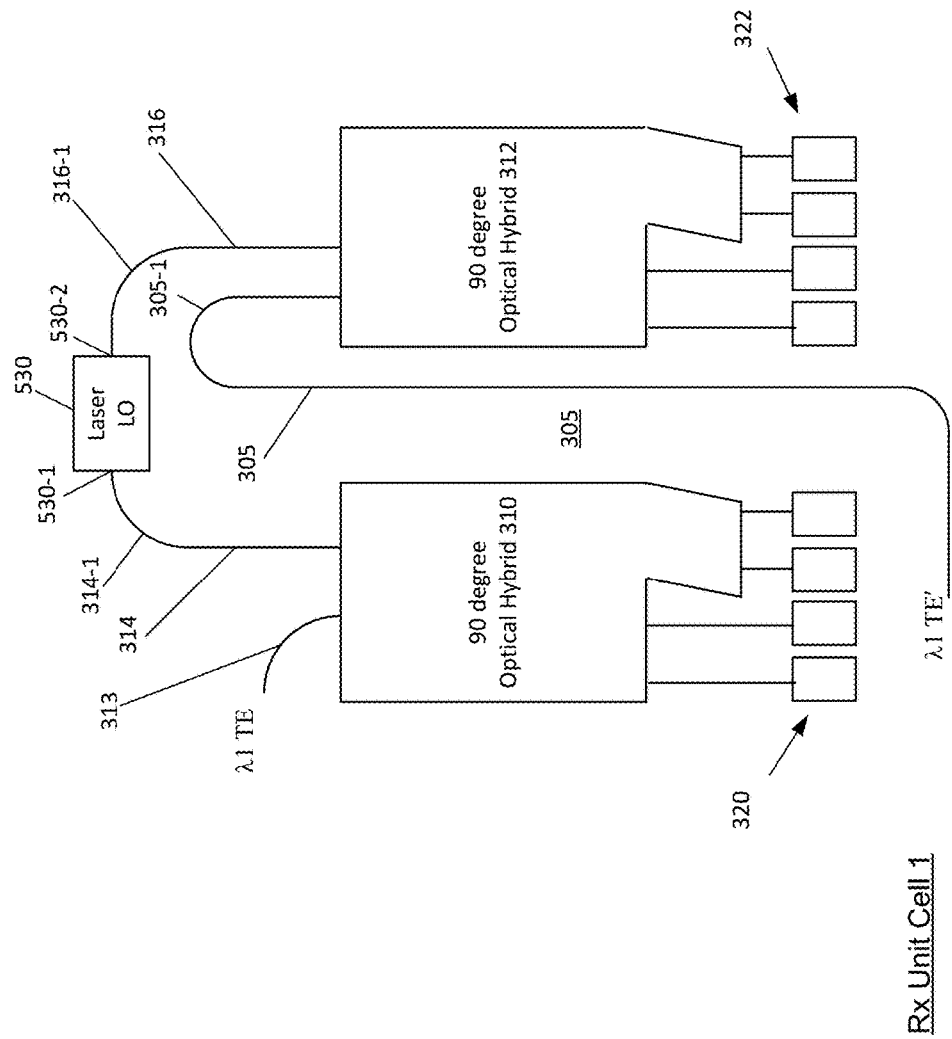

In the example shown in FIG. 5b, 90 degree optical hybrid circuit 310 is spaced from 90 degree optical hybrid circuit 312 by substrate region 307, as noted in the above example. In FIG. 5b, however, since laser LO 530 is provided outside this region, the optical hybrid circuits 310, 312 may be provided closer to one another than in the above examples to achieve further increases in device density. In addition, shorter waveguides 314, 316 extending from respective facets or sides 530-1, 530-2 of laser LO 530 may supply the first and second CW optical signals to corresponding 90-degree optical hybrid circuits 310, 312. Waveguides 314 and 316 may also have respective bent portions 314-1 and 316-1, as further shown in FIG. 5b, to direct the CW optical signals to the optical hybrid circuits 310, 312. Waveguide 305 extends over region 307, as noted above.

Figure 5C:
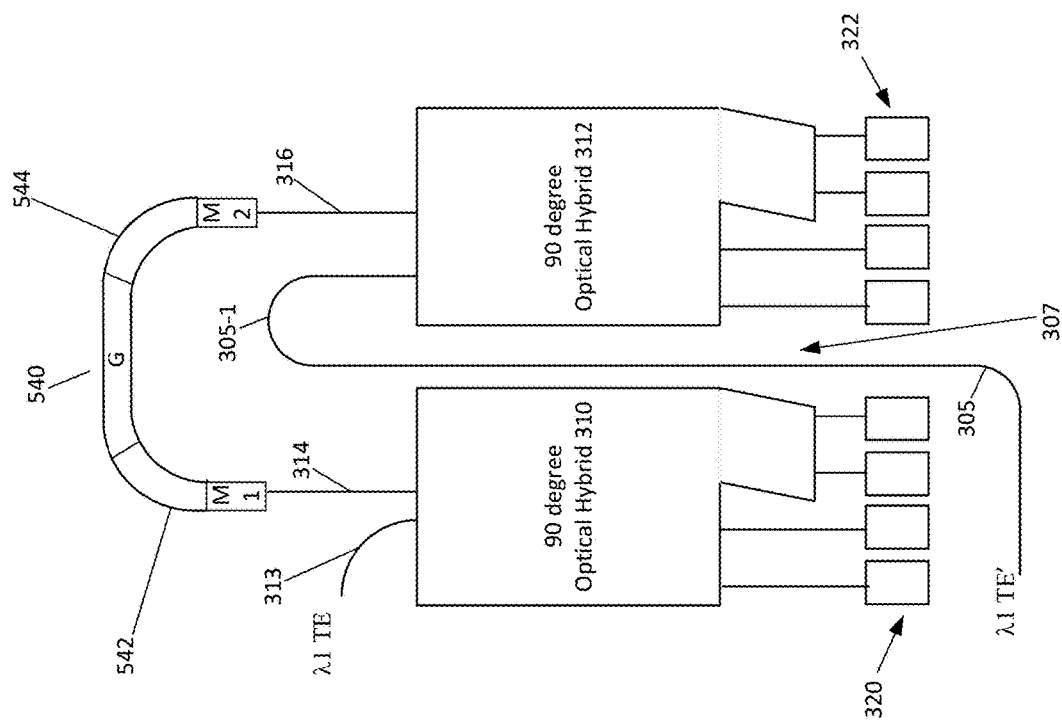

Thus, in FIG. 5b, laser 510 is straight, and the waveguides supplying the CW optical signals to the optical hybrid circuits are bent or curved. The example shown in FIG. 5c is similar to that shown in FIG. 5b, with the exception that the LO laser is bent and the waveguides supplying CW optical signals to the optical hybrid circuits are straight. In particular, in FIG. 5c, LO laser 540 is provided with a gain section (G) provided between mirror sections (M1, M2) that are oriented at angles to gain section G, such that curved waveguide sections (542, 544) extend between each mirror section and a corresponding side of the gain section. These angles may be 90 degrees, for example. In addition, waveguide sections 542, 544 may be passive sections located in the cavity of LO laser 540, as defined, for example, by mirror sections M1 and M2. Waveguide sections 542, 544 may be electrical and or thermal isolation sections or may also include a passive waveguide. Alternatively or in addition, waveguide sections 542, 544 may provide phase control of light output from laser 510.

The arrangement shown in FIG. 5c may be more compact than that shown in FIG. 5b because the LO laser 540 is bent or curved into a U-shape.

Figure 5D:
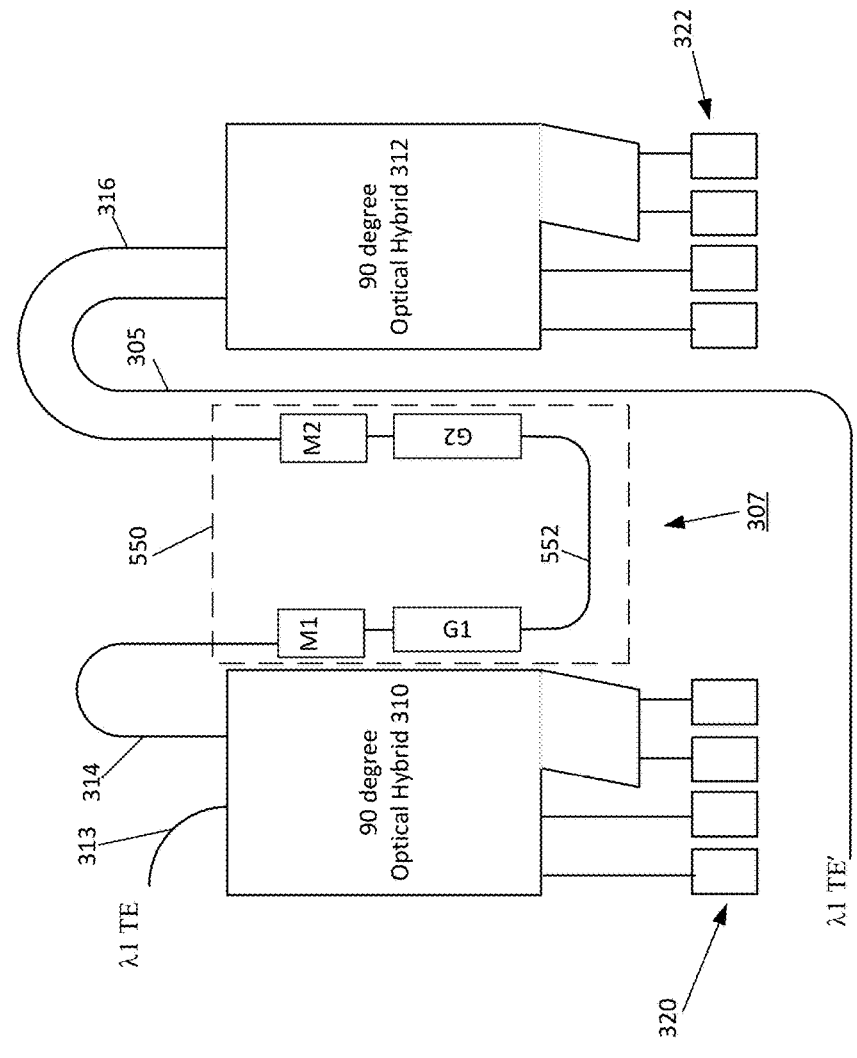

FIG. 5d illustrates another example of a curved or U-shaped LO laser 550 similar to the example shown in FIG. 5c. Here, however, the gain region of the LO laser is split into two sections G1 and G2, which are provided in region 307 between the optical hybrid circuits 310, 312. As further shown in FIG. 5d, gain sections G1 and G2 are optically connected to one another by a looped, bent, or hairpin-shaped waveguide 552, which may be a passive waveguide similar to that described above in connection with FIG. 5c.

In each of the above examples, the LO laser may include a distributed feedback (DFB) laser or DBR laser. Such lasers may have a limited tuning range, as noted above. Alternatively, widely tunable lasers may be employed, such as in FIGS. 5a-5d. As described above, various configurations are provided in which optical waveguides are passed between LO lasers and optical hybrid devices in order to reduce optical circuit size and provide a cascadable device architecture in a denser photonic integrated circuit. Moreover, waveguide crossings that otherwise introduce loss and reflections are avoided.

Figure 6:
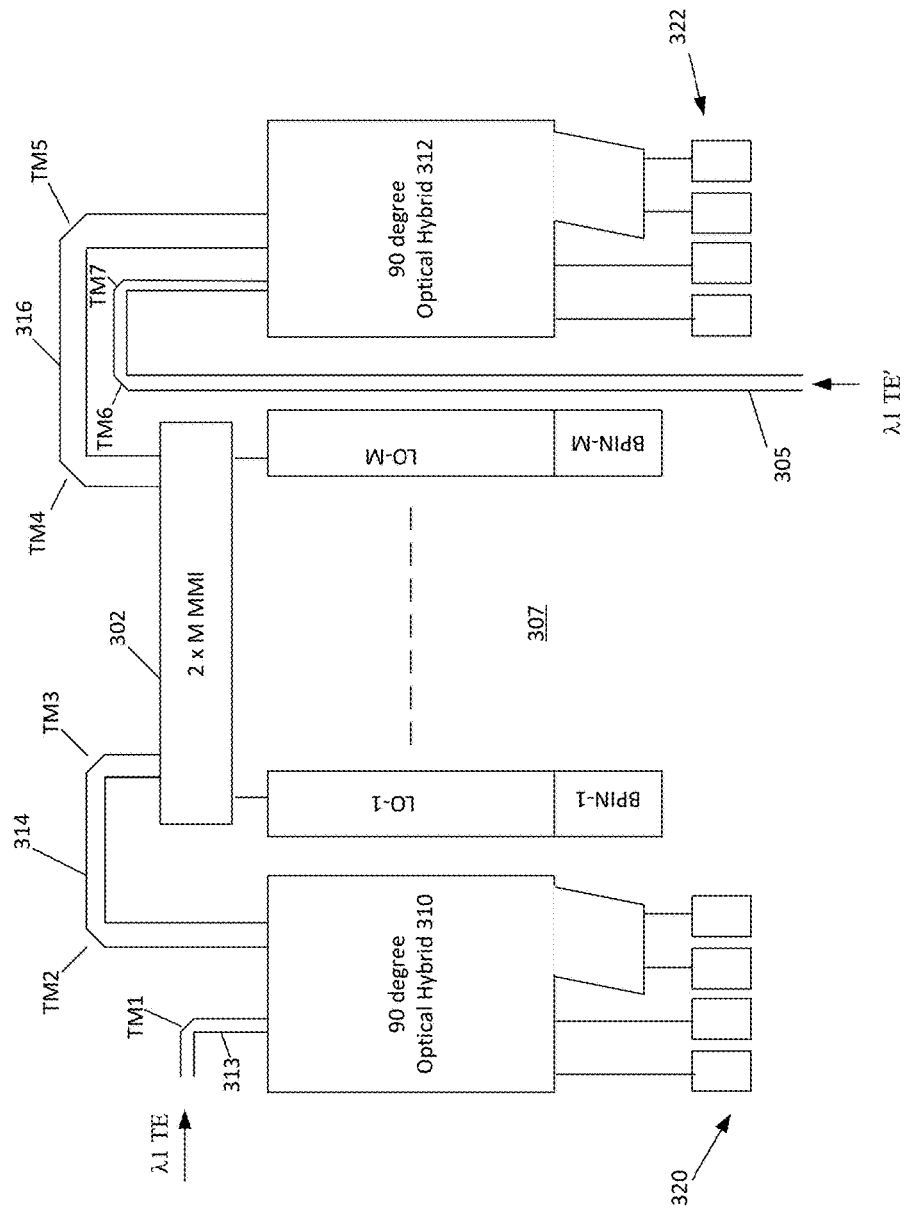

In each of the above examples, curved portions or bends direct light from the MMI coupler or the local oscillator laser to the 90-degree optical hybrid circuits. Consistent with the present disclosure, however, such bends may be replaced with turning mirrors that change the propagation direction of light in the waveguide by 90 degrees, for example. In one example, turning mirrors may replace bends or curved portions of selected waveguides in Rx Unit Cell 1 shown in FIG. 1. In particular, as shown in FIG. 6, light output from the 2×M MMI coupler 302 is reflected at an angle of 90 degrees, for example, by turning mirrors TM2 and TM3 in waveguide 314 and by turning mirrors TM4 and TM5 in waveguide 316. Additional turning mirrors TM6 and TM7 are provided in waveguide 305, and turning mirror TM1 is provided in waveguide 313 to direct optical signals noted above to the optical hybrid circuits.

It is noted that light may be reflected at angles other than 90 degrees. In addition, the bent or curved passive sections described above in connection with the lasers shown in FIGS. 5c and 5d may also be replaced with turning mirrors, so that these lasers may have a more compact design than those shown above having looped or curved bends. Moreover, by providing a more compact design, longer laser cavity lengths and reduced line widths can be realized.

Figure 7A:
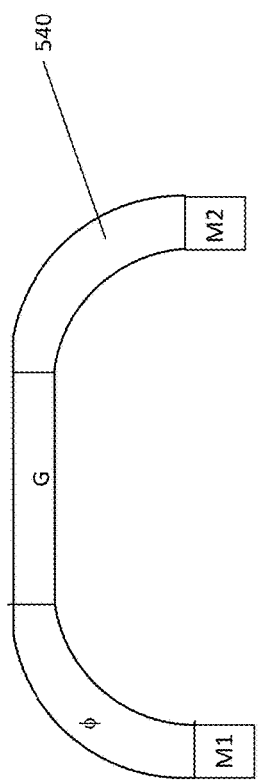
FIGS. 7a and 7b illustrate examples of local oscillator laser configurations consistent with an additional aspect of the present disclosure.

Lasers having a compact design, other than those discussed above, may also be employed as local oscillator lasers in each of the above-described embodiments. For example, as shown in FIG. 7a, a laser 710 may be provided that has, in addition to mirror (M1,M2) and gain (G) section, a phase adjusting or control section ϕ that is provided between mirror section M1 and gain section G. A passive section may also be provided between mirror section M2 and gain section G. Another phase adjusting section may also be provided between gain section G and mirror section M2.

Figure 7B:
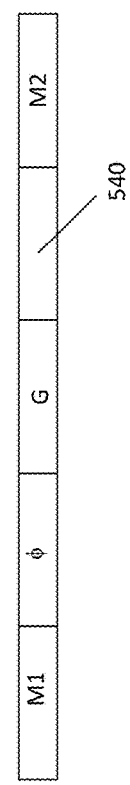

FIG. 7b shows another example of a local oscillator laser, similar to that shown in FIG. 7a, with the exception that laser 720 shown in FIG. 7b is linear or straight and does not include any curved or bent portions in the cavity defined by mirrors M1 and M2.

Other embodiments will be apparent to those skilled in the art from consideration of the specification. It is intended that the specification and examples be considered as exemplary only, with a true scope and spirit of the invention being indicated by the following claims.

What is claimed is:

1. A receiver circuit, comprising:
   a plurality of local oscillator lasers, each of which being configured to output a corresponding one of a plurality of continuous wave (CW) optical signals, each of the plurality of CW optical signals having a corresponding one of a plurality of wavelengths;
   a coupler having a plurality of inputs, a first output, and a second output;
   a control circuit that provides a control signal, such that the selected one of the plurality of CW optical signals is provided to a corresponding one of the plurality of inputs based on the control signal;

a first waveguide that receives a first portion of the selected one of the plurality of CW optical signals from the first output of the coupler, the first waveguide having a bent portion;

a second waveguide that receives a second portion of the selected one of the plurality of CW optical signals from the second output of the coupler, the second waveguide having a bent portion;

a first optical hybrid circuit that receives a first portion of the selected one of the plurality of CW optical signals and a first modulated optical signal, the first optical hybrid circuit supplying a first plurality of mixing products; and a second optical hybrid circuit that receives a second portion of the selected one of the plurality of CW optical signals and a second modulated optical signal, the second optical hybrid circuit supplying a second plurality of mixing products.

2. A receiver circuit in accordance with claim 1, further including a substrate, the plurality of optical oscillator lasers, the coupler, the first and second waveguides, and the first and second optical hybrid circuits being provided on the substrate.

3. A receiver circuit in accordance with claim 2, wherein the substrate includes indium phosphide (InP).

4. A receiver circuit in accordance with claim 1, further including a substrate, the plurality of optical oscillators, the first optical hybrid circuit, and the second optical hybrid circuit being provided on the substrate, the plurality of local oscillator lasers being provided on a region of the substrate between the first optical hybrid circuit and the second optical hybrid circuit.

5. A receiver circuit in accordance with claim 1, wherein the first waveguide is U-shaped and the second waveguide is U-shaped.

6. A receiver circuit in accordance with claim 1, wherein the coupler is a multi-mode interference (MMI) coupler.

7. A receiver in accordance with claim 6, further having a third output, the third output being coupled to one of: a wavelength locking circuit or a device that substantially prevents light from being reflected back to the coupler.

8. A receiver circuit in accordance with claim 1, further including a plurality of variable optical attenuators, each of which being provided between a respective one of the plurality of local oscillator lasers and a respective one of the plurality of inputs of the coupler.

9. A receiver in accordance with claim 8, wherein, based on the control signal supplied by the control circuit, one of the plurality of variable optical attenuators has an attenuation that is less than an attenuation of each of remaining ones of the plurality of attenuators, such that the selected one of the plurality of CW optical signals is output from said one of the plurality of optical attenuators to the corresponding one of the plurality inputs of the coupler.

10. A receiver circuit in accordance with claim 1, further including a plurality of semiconductor optical amplifiers, each of which being provided between a respective one of the plurality of local oscillator lasers and a respective one of the plurality of inputs of the coupler.

11. A receiver circuit in accordance with claim 1, further including a plurality of multifunctional elements (MFEs), each of which being provided between a respective one of the plurality of local oscillator lasers and a respective one of the plurality of inputs of the coupler, wherein one of the plurality of MFEs is biased to provide gain to supply the selected one of the plurality of CW optical signals to the corresponding one of the plurality of inputs of the coupler.

12. A receiver circuit in accordance with claim 1, wherein based on the control signal, one of the plurality of local oscillator lasers is activated, such that the activated one of the plurality of local oscillator lasers supplies the selected one of the plurality of CW optical signals to the corresponding one of the plurality of inputs of the coupler.

13. A receiver circuit in accordance with claim 1, further including a first group of photodiodes and a second group of photodiodes, each photodiode in the first group of photodiodes receiving a respective one of the first plurality of mixing products and each photodiode in the second group of photodiodes receiving a respective one of the second plurality of mixing products.

14. A receiver circuit in accordance with claim 1, wherein the first waveguide including a first turning mirror that receives the first portion of the selected one of the plurality of CW optical signals, and the second waveguide includes a second turning mirror that receives the second portion of the selected one of the plurality of CW optical signals.

15. A receiver circuit in accordance with claim 14, wherein each of the plurality of local oscillator lasers includes a first mirror section, a second mirror section, and a gain section, each of the plurality of local oscillator lasers further including a phase section provided between the first and second mirror sections.

16. A receiver circuit in accordance with claim 1, wherein the plurality of local oscillator lasers is a first plurality of local oscillator lasers, the plurality of CW optical signals is a first plurality of CW optical signals, the plurality of wavelengths is a first plurality of wavelengths, the output of the control circuit is a first output, and the coupler is a first coupler, the receiver circuit further including:

a second plurality of local oscillator lasers, each of which being configured to output a corresponding one of a second plurality of continuous wave (CW) optical signals, each of the second plurality of CW optical signals having a corresponding one of a second plurality of wavelengths;

a second coupler having a plurality of inputs, a first output, and a second output, the control circuit providing a second control signal, such that the selected one of the second plurality of CW optical signals is provided to a corresponding one of the plurality of inputs of the second coupler based on the second control signal;

a third waveguide that receives a first portion of the selected one of the second plurality of CW optical signals from the first output of the second coupler, the third waveguide having a bent portion;

a fourth waveguide that receives a second portion of the selected one of the second plurality of CW optical signals from the second output of the second coupler, the fourth waveguide having a bent portion;

a third optical hybrid circuit that receives a first portion of the selected one of the second plurality of CW optical signals and a third modulated optical signal, the third optical hybrid circuit supplying a third plurality of mixing products; and a fourth optical hybrid circuit that receives a second portion of the selected one of the second plurality of CW optical signals and a fourth modulated optical signal, the fourth optical hybrid circuit supplying a fourth plurality of mixing products.

17. A receiver circuit in accordance with claim 1, further including:

a polarization beam splitter that receives a polarization multiplexed optical signal, the polarization multiplexed optical signal including a first component having a first polarization and a second component having a second polarization, the polarization beam splitter having a first output and a second output, such that the first component is output from the first output of the polarization beam splitter and the second component is output from the second output of the polarization beam splitter; and a rotator that receives the second component and outputs the second component with the first polarization, such that the first component is the first modulated optical signal and the second component is the second modulated optical signal.

18. A receiver circuit in accordance with claim 1, further including:

a polarization beam splitter that receives a polarization multiplexed optical signal, the polarization multiplexed optical signal including a plurality of first components, each of which having a first polarization and a corresponding one of a plurality of frequencies, and a second plurality of components, each of which having a second polarization and a second plurality of frequencies, the polarization beam splitter having a first output and a second output, such that the plurality of first components are output from the first output of the polarization beam splitter and the plurality of second components are output from the second output of the polarization beam splitter;

a rotator that receives the plurality of second components and outputs each of the plurality of second components with the first polarization;

a demultiplexer circuit that receives the plurality of first components and the plurality of second components with the first polarization, the demultiplexer having first and second pluralities of outputs, the first plurality of outputs of the demultiplexer circuit supplying the plurality of first components and the second plurality of outputs of the demultiplexer supplying the plurality of second components with the first polarization, the first optical hybrid circuit receiving one of the plurality of first components as the first modulated optical signal, and the second optical hybrid circuit receiving one of the plurality of second components with the first polarization as the second modulated optical signal.

19. A receiver circuit, comprising:

a substrate;

a local oscillator laser provided on the substrate;

a first optical hybrid circuit and a second optical hybrid circuit provided on the substrate, such that the first optical hybrid circuit and the second optical hybrid circuit are spaced from one another by a region of the substrate, at least a portion of the local oscillator laser being provided on the region of the substrate; and a first waveguide having a bent portion; and a second waveguide having a bent portion, such that the first waveguide carries a first CW optical signal output from a first side of the local oscillator laser to the first optical hybrid circuit, and the second waveguide carries a second CW optical signal output from a second side of the local oscillator laser to the second optical hybrid circuit, the first optical hybrid circuit receiving a first modulated optical signal and the second optical hybrid circuit receiving a second modulated optical signal, wherein, based on the first modulated optical signal and the first CW optical signal, the first optical hybrid circuit outputs a first plurality of mixing products, and based on the second modulated optical and the second CW optical signal, the second optical hybrid circuit outputs a second plurality of mixing products.

20. A receiver circuit in accordance with claim 19, wherein the local oscillator laser has first and second mirror sections and a gain section, the first and second mirror sections and gain section are arranged linearly.

21. A receiver circuit in accordance with claim 19, wherein the local oscillator laser has a first mirror and a second mirror section, and a gain section provided between the first and second mirror sections, the local oscillator laser further including a phase section between the first and second mirror sections.

22. A receiver circuit in accordance with claim 19, wherein the local oscillator laser has first and second mirror sections and first and second gain sections, the first and second mirror sections extending parallel to one another and the first and second gain sections extending parallel to one another.

23. A receiver circuit in accordance with claim 19, wherein the local oscillator laser is U-shaped.

24. A receiver circuit in accordance with claim 19, wherein the local oscillator has a first mirror and a second mirror section, a portion of the local oscillator laser extending from the first mirror section to the second mirror section is linear, such that the portion of the local oscillator laser does is not bent.

25. A receiver circuit in accordance with claim 19, further including:

a polarization beam splitter that receives a polarization multiplexed optical signal, the polarization multiplexed optical signal including a first component having a first polarization and a second component having a second polarization, the polarization beam splitter having a first output and a second output, such that the first component is output from the first output of the polarization beam splitter and the second component is output from the second output of the polarization beam splitter; and a rotator that receives the second component and outputs the second component with the first polarization, such that the first component is the first modulated optical signal and the second component is the second modulated optical signal.

26. A receiver circuit in accordance with claim 19, further including:

a polarization beam splitter that receives a polarization multiplexed optical signal, the polarization multiplexed optical signal including a plurality of first components, each of which having a first polarization and a corresponding one of a plurality of frequencies, and a second plurality of components, each of which having a second polarization and a second plurality of frequencies, the polarization beam splitter having a first output and a second output, such that the plurality of first components are output from the first output of the polarization beam splitter and the plurality of second components are output from the second output of the polarization beam splitter;

a rotator that receives the plurality of second components and outputs each of the plurality of second components with the first polarization;

a demultiplexer circuit that receives the plurality of first components and the plurality of second components with the first polarization, the demultiplexer having first and second pluralities of outputs, the first plurality of outputs of the demultiplexer circuit supplying the plurality of first components and the second plurality of outputs of the demultiplexer supplying the plurality of second components with the first polarization, the first optical hybrid circuit receiving one of the plurality of first components as the first modulated optical signal, and the second optical hybrid circuit receiving one of the plurality of second components with the first polarization as the second modulated optical signal.

27. A receiver circuit, comprising:
a substrate;
a local oscillator laser provided on the substrate;
a first optical hybrid circuit and a second optical hybrid circuit provided on the substrate, such that the first optical hybrid circuit and the second optical hybrid circuit are spaced from one another by a region of the substrate; and
a first waveguide; and
a second waveguide, such that the first waveguide carries a first CW optical signal output from a first side of the local oscillator laser to the first optical hybrid circuit, and the second waveguide carries a second CW optical signal output from a second side of the local oscillator laser to the second optical hybrid circuit;
a third waveguide, the first optical hybrid circuit receiving a first modulated optical signal and the second optical hybrid circuit receiving a second modulated optical signal supplied by the third waveguide, the third waveguide extending over the region of the substrate between the first and second optical hybrid circuits,
wherein, based on the first modulated optical signal and the first CW optical signal, the first optical hybrid circuit outputs a first plurality of mixing products, and based on the second modulated optical and the second CW optical signal, the second optical hybrid circuit outputs a second plurality of mixing products.

28. A receiver circuit in accordance with claim 27, wherein the first waveguide including a bent portion and the second waveguide includes a bent portion.

29. A receiver circuit in accordance with claim 28, wherein the first waveguide includes a first turning mirror that receives the first CW optical signal, and the second waveguide includes a second turning mirror that receives the second CW optical signal.

30. A receiver circuit in accordance with claim 27, wherein the local oscillator laser includes a first mirror section, a second mirror section, and a gain section provided between the first and second mirror sections, the gain section being spaced from the first mirror section by a first routing region and being spaced from the second mirror section by a second routing region, the first routing region including a first bend and the second routing region including a second bend.

31. A receiver circuit in accordance with claim 27, wherein the local oscillator laser is U-shaped.

32. A receiver circuit in accordance with claim 27, further including a first variable optical attenuator provided between the first side of the local oscillator laser and the first optical hybrid circuit, and a second variable optical attenuator provided between the second side of the local oscillator laser and the second optical hybrid circuit.

33. A receiver circuit in accordance with claim 27, further including a semiconductor optical amplifier provided between the first side of the local oscillator laser and the first optical hybrid circuit, and a second semiconductor optical amplifier provided between the second side of the local oscillator laser and the second optical hybrid circuit.

34. A receiver circuit in accordance with claim 27, further including a first group of photodiodes and a second group of photodiodes, each photodiode in the first group of photodiodes receiving a respective one of the first plurality of mixing products and each photodiode in the second group of photodiodes receiving a respective one of the second plurality of mixing products.

35. A receiver circuit in accordance with claim 27, further including:
a polarization beam splitter that receives a polarization multiplexed optical signal, the polarization multiplexed optical signal including a first component having a first polarization and a second component having a second polarization, the polarization beam splitter having a first output and a second output, such that the first component is output from the first output of the polarization beam splitter and the second component is output from the second output of the polarization beam splitter; and
a rotator that receives the second component and outputs the second component with the first polarization, such that the first component is the first modulated optical signal and the second component is the second modulated optical signal.

36. A receiver circuit in accordance with claim 27, further including:
a polarization beam splitter that receives a polarization multiplexed optical signal, the polarization multiplexed optical signal including a plurality of first components, each of which having a first polarization and a corresponding one of a plurality of frequencies, and a second plurality of components, each of which having a second polarization and a second plurality of frequencies, the polarization beam splitter having a first output and a second output, such that the plurality of first components are output from the first output of the polarization beam splitter and the plurality of second components are output from the second output of the polarization beam splitter;
a rotator that receives the plurality of second components and outputs each of the plurality of second components with the first polarization;
a demultiplexer circuit that receives the plurality of first components and the plurality of second components with the first polarization, the demultiplexer having first and second pluralities of outputs, the first plurality of outputs of the demultiplexer circuit supplying the plurality of first components and the second plurality of outputs of the demultiplexer supplying the plurality of second components with the first polarization,
the first optical hybrid circuit receiving one of the plurality of first components as the first modulated optical signal, and the second optical hybrid circuit receiving one of the plurality of second components with the first polarization as the second modulated optical signal.

37. A system, comprising:
a plurality of optical transmitters, each of which supplying a respective one of a plurality of optical signal to a corresponding one of a plurality of optical fibers;
a plurality polarization beam splitters, each of which being coupled to a respective one of the plurality of optical fibers, each of the plurality of polarization beam splitters providing a corresponding one of a plurality of first optical outputs, each of which having a first polarization and a corresponding one of a plurality of second optical outputs, each of which having a second polarization;
a plurality of rotators, each of which receiving a corresponding one of the plurality of second optical outputs and supplying a respective one of a plurality of rotated outputs, each of the plurality of rotated outputs having the first polarization;

a plurality of receiver circuits, each of which receiving a respective one of the plurality of rotated outputs and a corresponding one of the first optical outputs from a respective one of the plurality of polarization beam splitters, each of the plurality of receiver circuits including:

a plurality of local oscillator lasers, each of which being configured to output a corresponding one of a plurality of continuous wave (CW) optical signals, each of the plurality of CW optical signals having a corresponding one of a plurality of wavelengths;

a coupler having a plurality of inputs, a first output, and a second output;

a control circuit that provides a control signal, such that the selected one of the plurality of CW optical signals is provided to a corresponding one of the plurality of inputs based on the control signal;

a first waveguide that receives a first portion of the selected one of the plurality of CW optical signals from the first output of the coupler, the first waveguide having a bent portion;

a second waveguide that receives a second portion of the selected one of the plurality of CW optical signals from the second output of the coupler, the second waveguide having a bent portion;

a first optical hybrid circuit that receives a first portion of the selected one of the plurality of CW optical signals and a first modulated optical signal, the first optical hybrid circuit supplying a first plurality of mixing products; and a second optical hybrid circuit that receives a second portion of the selected one of the plurality of CW optical signals and a second modulated optical signal, the second optical hybrid circuit supplying a second plurality of mixing products.

* * * * *